US006922701B1

(12) United States Patent
Ananian et al.

(10) Patent No.: US 6,922,701 B1
(45) Date of Patent: Jul. 26, 2005

(54) GENERATING CAD INDEPENDENT INTERACTIVE PHYSICAL DESCRIPTION REMODELING, BUILDING CONSTRUCTION PLAN DATABASE PROFILE

(76) Inventors: John A. Ananian, 300-50 Kamiyamae, Aza, Oya, Ogawara-machi, Shibata-gun, Miyagi, 989-1201 (JP); Daniel J. Duggan, 1660 Strougler Rd., Nanoose Bay, British Columbia (CA) V9P 9C4; Steven R. Mahovlic, 100-374 Island Hwy West, Parksville, BC (CA)

( * ) Notice: Subject to any disclaimer, the term of this patent is extended or adjusted under 35 U.S.C. 154(b) by 451 days.

(21) Appl. No.: 09/632,383

(22) Filed: Aug. 3, 2000

(51) Int. Cl.[7] .............................................. G06F 17/30
(52) U.S. Cl. ........................... 707/104.1; 707/1; 707/6; 706/923; 703/1
(58) Field of Search ................... 707/1–10, 100–104.1, 707/200–205, 501.1, 511–514; 700/235–236, 700/97–98, 182; 703/1–6; 345/440, 173, 345/866, 964, 629, 418; 702/155–156, 152; 705/1–10, 705/400, 37–38; 52/73, 226, 268–272, 80; 706/919, 923

(56) References Cited

U.S. PATENT DOCUMENTS

| 4,700,318 A | 10/1987 | Ockman ...................... 364/518 |
| 4,868,766 A | 9/1989 | Oosterholt ................... 364/522 |
| 4,885,694 A | 12/1989 | Pray et al. ............. 364/464.01 |
| 5,165,015 A | 11/1992 | Coggins ..................... 395/155 |

(Continued)

FOREIGN PATENT DOCUMENTS

EP           0851368    * 7/1998    .................... 17/30

(Continued)

OTHER PUBLICATIONS

Grier Cl Lin et al., development of international collaborative CAD/CAM, Proc.Joint Australia-Korea workshop on manufacturing technology Nov. 20-21, 1995, pp 155-168.*

(Continued)

Primary Examiner—Srirama Channavajjala

(57) ABSTRACT

A method for generating an interactive profile of a structure, such as a building, employing an interactive profile system that preferably utilizes an Internet web browser to interface with a user. The interactive profile system includes an application engine embodied in a computer program that is preferably based within a server. A plan set, usually in a CAD format, is received into the interactive profile system, typically submitted by the user or client. The building can be any structure, such as a home, office or warehouse, and can also include the property that the structure occupies. The plan set is converted to a profile data set by the profiling engine. In compliance with an enhanced data protocol, which is a specific format for organizing the profile data set in a standardized array. The profiling engine parses, or extracts, the profile data set to develop and link a plurality of potentially interrelated building. The profiling engine performs a systematic enhancement of the plan set, building upon the elemental physical descriptions of the plan set. Each element of the physical description is functionally analyzed for relational attributes and then expanded and tagged. The user directs a profile query to the application engine of the interactive profile system. The profile query is relatable to the enhanced profile and more specifically relatable to at least one of the plurality of interrelated elements of the building. Typical profile requests can include proposed or actual changes to the building, requests for material listings, and project assessments.

9 Claims, 3 Drawing Sheets

U.S. PATENT DOCUMENTS

| | | | | |
|---|---|---|---|---|
| 5,493,679 | A * | 2/1996 | Virgil et al. | 707/104.1 |
| 5,555,406 | A | 9/1996 | Nozawa | 395/500 |
| 5,557,537 | A | 9/1996 | Normann et al. | 364/512 |
| 5,572,639 | A * | 11/1996 | Gantt | 345/651 |
| 5,587,914 | A * | 12/1996 | Conradson et al. | 700/95 |
| 5,625,827 | A * | 4/1997 | Krause et al. | 715/502 |
| 5,732,264 | A * | 3/1998 | Tanaka | 707/4 |
| 5,761,674 | A * | 6/1998 | Ito | 707/104.1 |
| 5,818,428 | A * | 10/1998 | Eisenbrandt et al. | 345/173 |
| 5,918,219 | A * | 6/1999 | Isherwood | 705/37 |
| 5,950,206 | A * | 9/1999 | Krause | 707/104.1 |
| 5,983,010 | A * | 11/1999 | Murdock et al. | 703/6 |
| 6,014,503 | A * | 1/2000 | Nagata et al. | 703/1 |
| 6,037,945 | A | 3/2000 | Loveland | 345/420 |
| 6,085,126 | A * | 7/2000 | Mellgren et al. | 700/233 |
| 6,119,134 | A * | 9/2000 | Kigawa | 715/502 |
| 6,236,409 | B1 * | 5/2001 | Hartman | 345/629 |
| 6,345,258 | B1 * | 2/2002 | Pickens | 705/1 |
| 6,360,236 | B1 * | 3/2002 | Khan et al. | 715/526 |
| 6,381,594 | B1 * | 4/2002 | Eichstaedt et al. | 707/3 |
| 6,446,053 | B1 * | 9/2002 | Elliott | 705/400 |
| 6,701,288 | B1 * | 3/2004 | Normann et al. | 703/1 |
| 6,721,713 | B1 * | 4/2004 | Guheen et al. | 705/1 |
| 6,721,769 | B1 * | 4/2004 | Rappaport et al. | 707/205 |
| 6,816,819 | B1 * | 11/2004 | Loveland | 703/1 |
| 6,836,752 | B2 * | 12/2004 | Atasoy | 703/1 |
| 6,842,760 | B1 * | 1/2005 | Dorgan et al. | 707/104.1 |
| 2001/0047251 | A1 * | 11/2001 | Kemp | 703/1 |
| 2002/0046147 | A1 * | 4/2002 | Livesay et al. | 705/37 |
| 2002/0083076 | A1 * | 6/2002 | Wucherer et al. | 707/102 |
| 2004/0083157 | A1 * | 4/2004 | Sasser | 705/37 |
| 2004/0107125 | A1 * | 6/2004 | Guheen et al. | 705/7 |
| 2005/0004783 | A1 * | 1/2005 | Carey | 703/1 |

FOREIGN PATENT DOCUMENTS

EP 0855687 A2 * 7/1998

OTHER PUBLICATIONS

U.S. Appl. No. 60/186,756.*

Tan,Hock,S et al., Knowledge construction in education: A web database for building interactive 3D environments 5 pages [da unknown].*

Anil S et al., "Internet-based interactive construction management learning system," internet based constructin management learning conference, Phoenix,AZ Dec. 1999, session 3226, 10 pages.*

Daniel W H, et al. "real world applications of constructin process simulation", proceedings of the 1999 winter simulation conference, pp 956-962.*

Vineet R. Kamat et al. << 3D visualization of simulated construction operations, proceedings of the 2000 winter simulation confernece, pp 1933-1937.*

Farid Ameziane et al. "Sysbat-An Application to the Building Production Based on Computer Supporte Cooperative Work", IKM 2003, pp 1-11.*

Archibus Inc., "Archibus/FM Web Central", Chapter-3 pp.: 1-11 "http://216.233.80.20./afm/doc/_Introduction.htm", Jul. 17, 2000.

Booz Allen & Hamilton, "CAFM Selection and Implementation", "http://www.bah.com/fso/cafm.html", last modified Aug. 20, 1999 pp. 1-4 only.

XML, "Integration by Parts: XSLT, Xlink, and SVG", "http://www.xml.com/pub/2000/03/22/style/index.html", Jul. 13, 2000, pp. 1-13 only.

FotoG, "Close Range Photogrammetry", "http://www.vexcel.com/fotog", Jul. 11, 2000, one page only.

Comfortlife, "Measuring Devices", "http://www.sgfa.com/comfortlife/electronic_tapes.html", Jul. 11, 2000, 5 pages only.

MicroStation, "Plant Engineering", "http://ww.w.msmonline.com/extra/jan00/plant1.htm", Jul. 11, 2000, 1-5 pages.

Service Magic, "Start A New Home Project", http://www.servicemagic.com/cgi-bin/servicemagic/scripts/index.jsp, May 8, 2000, 6 pages only.

MIT Media Laboratory, "HandSCAPE: A Vectorizing Tape Measure for On-Site Measuring Applications", Apr. 1-6, 2000, ACM Press, pp. 1-8.

Alshawi et al., "An IFC Web-Based Collaborative Construction Computer Environment: WISPER,"*Proceedings of the International Construction IT Conference*, pp. 8-29, Sep. 1999.

Jones et al., "IV 97: Interactive Visualisation Through Applied Virtual Reality in Construction,"*Information Visualization, 1997, Proceedings, 1997 IEEE Conference on London, UK 27-29, Aug. 1997*, pp. 166-172, Aug. 1997.

Faraj et al., "An Industry Foundation Classes Web-Based Collaborative Construction Computer Environment: WISPER,"*Automation in Construction*, (Amsterdam: Elsevier Science Publishers), vol. 10, No. 1, (pp. 79-99), Nov. 2000.

* cited by examiner

GENERATING CAD INDEPENDENT INTERACTIVE PHYSICAL DESCRIPTION REMODELING, BUILDING CONSTRUCTION PLAN DATABASE PROFILE

TECHNICAL FIELD

The invention relates to a method of creating a profile of a building. The building profile is composed of the highly detailed structural, spatial, locational and functional attributes of the building. More particularly, the invention relates to a method of interactively profiling a structure, preferably with a web browser over the Internet.

BACKGROUND OF THE INVENTION

The process of specifying the structural components of a building has remained essentially unchanged over the past several decades. The building specification process is an interaction between the client, who for residential projects is typically the homeowner, and the builder or contractor.

The typical specification process begins with the client seeking the design services of an architect or possibly a builder. The design service provider asks the client a series of questions to identify the needs and desires of the client, relating to the building. The designer must also ascertain the financial capabilities of the client to formulate a draft plan. The designer typically creates a graphical representation of the proposed design concept with sketches or rough layouts. Upon mutual agreement of the concept, the professional can then establish an estimate of the costs based upon the location of the building on the property and the materials specified by the client.

When the building siting, design specifications and costs are acceptable to the client, a "Scope of Work" is established. The Scope of Work is a detailed listing of the responsibilities and required components of the building project. The details of building even a simple residential structure can be extensive.

The implementation of the Scope of Work, however, often follows a chaotic process that leaves the many design decisions involved in building home out of any formal, systematized methodology. The home buyer generally does not have a sound grasp of the many details that require their attention during the building process, (i.e.: design of floor systems, roof gutters, cabinet configurations, etc.) leaving significant opportunities for mistakes, errors in judgment, and costly changes to arise.

The linkage between the client's interests and the builder's interests is tenuous, because the parties have divergent objectives: the client wants the most for their money, and the builder wants to maximize profit. There are, of course, additional peripheral objectives associated with the builder, such as wanting to establish a positive reputation, but the fact remains that the builder must make a profit to remain in business, and that can often be at the expense of the client's interests. The manner in which the construction phase unfolds defines the quality of the finished product, and since the parties have differing goals the satisfactory completion of the product can be elusive.

A common scenario involves a high level of involvement by the client at the beginning, then as the project progresses through to completion, the client involvement declines due to logistical and economic constraints. The builder may even make decisions that the client is unaware of in order to expedite the project or improve profitability.

Perhaps the highest additional cost a client faces is when they make a design change after the associated work has been started. The builder has to simultaneously adhere to the construction schedule and spend additional resources to meet the client's wishes. This situation almost always involves significant "up charges" to the client, which could have been avoided if all of the details had been properly thought through before the construction phase began.

A method is needed for improving interaction between the client and the professionals throughout the construction process; to ensure consistent and informed client input, and to involve the client in making informed, cost-effective decisions, while maintaining the client's visionary perspective, thereby assisting the professionals with timely decisions that have a minimum adverse impact on the project's progress.

One technology that is coming of age and enabling efficient interaction is the Internet. If the Internet could provide a means to orchestrate the interaction between the builder/contractor and the client/homeowner, a significant reduction in the extensive time and increasing complexity of home building could then be realized. However, an integrated, Internet-based application that combines property elements, design regulations and requirements of building specifications in a system is not currently available, and for good reasons. The intricacies of such a system have so far made this too complex a task to be performed over the Internet. A streamlined, interactive method, preferably utilizing the resources of the Internet, is needed for making and tracking the many selections and decisions required in building construction.

SUMMARY OF INVENTION

The present invention provides a method for generating an interactive profile of a building. The method employs an interactive profile system and preferably utilizes an Internet web browser to interface with a user. The interactive profile system includes an application engine embodied in a computer program that is preferably based within a server. The user can include a client or a group of clients.

The profile system of the present invention is developed from a plan set received into the interactive profile system, as typically submitted by the client. The plan set is usually in CAD format, comprising an elemental physical description of a building. The building can be any structure, such as a home, office or warehouse, and as employed herein also includes the property that the structure occupies. Therefore the site aspects of the structure, such as the location of the structure on the property and the routing of utilities to the structure, are also included in this broad definition of a building.

All structures include a plurality of potentially interrelated building components. These interrelated building components are functionally grouped structures or features that comprise components of the finished building. The plan set may include some of these interrelated building components. However, the fundamental plan set must be expanded and developed if a true, building profile is to be realized.

To expand the received plan set into the building's profile database, the plan set is converted to a profile data set by the profiling engine. The profile data set is compliant with an enhanced data protocol, which is a specific format for organizing the profile data set in a standardized array. The profiling engine "parses", or extracts, the profile data set to develop and link the plurality of potentially interrelated building components to develop a plurality of interrelated components. The profiling engine performs a systematic enhancement of the plan set, building upon the elemental physical descriptions of the plan set. Each element of the physical description is functionally analyzed for relational attributes and then expanded. Links are created within the profile data set, between related components.

The parsed profile data is then compiled into an enhanced profile. The enhanced profile includes a plurality of interrelated components, which are essentially the aggregate of the building components as developed and linked in the parsing step, from the plurality of potentially related building components.

In the compiling of the enhanced profile, each one of the plurality of interrelated components, is assigned a unique descriptor tag. Compiling also incorporates into the enhanced profile the interrelationships between analogous components of the building and stores this enhanced profile in a profile database.

A user directs a profile query to the application engine of the interactive profile system. The profile query is preferably submitted over the Internet with the user's web browser. The profile query is relatable to the enhanced profile and more specifically relatable to at least one of the plurality of interrelated elements of the building. Typical profile requests can include proposed or actual changes to the building, requests for material listings, project assessments, and analysis of current features or components.

The application engine interfaces with the profile database and potentially with auxiliary databases for supplementary information to compile the required response to the query. The application engine responds to the profile query with a profile response. The profile response includes a listing of at least one of the plurality of interrelated elements of the enhanced profile. The profile response to the profile query is sent to the user, preferably over the Internet to the user's web browser.

The interactive profile system of the present invention preferably employs the Internet to interact with the users of the application engine. A significant reduction in the time, complexity and uncertainty involved in the design of a structure is realized through the novel application engine that this invention provides. The intricacies of material selection and design changes are coordinated and simplified into a series of specific functions of the application engine of the present invention. For each progressing project, the application engine can receive revisions and comments from any number of users, and track the revision history of the project from inception to completion.

The present invention provides improved interaction between the client and the builder throughout the construction process. Input from the client is not only maintained throughout the design and building, but the client drives the process forward, better empowered to make cost effective decisions that meet the client's needs. The builder gains advantages by acquiring a fully detailed build specification from the client that includes all of the necessary decisions and choices of the client. This reduces lengthy communications between the builder and client, making the builder more efficient and able to focus on the core task: building the house.

Still further aspects and advantages of the invention will become apparent from consideration of the following figures and detailed description.

DETAILED DESCRIPTION OF SPECIFIC EMBODIMENTS

The present invention develops and utilizes an interactive profile of a building. The interactive profile is useful in many aspects, including estimation, design, construction, renovation or remodeling and analysis of the building. The invention preferably employs an Internet web browser to provide a user interface into the developed profile data set.

Overview

Figure 1:
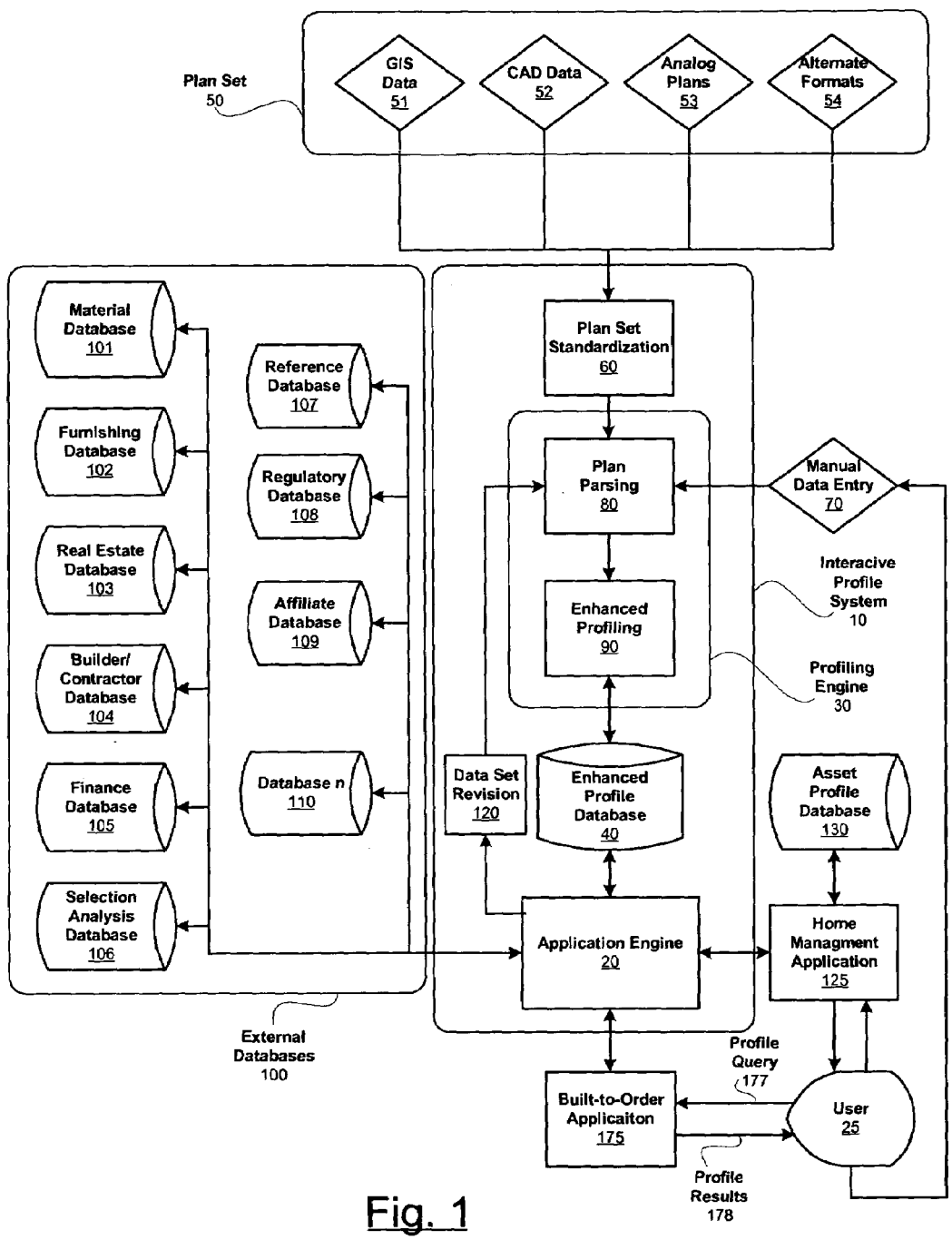
FIG. 1 is a block diagram of steps taken in practicing an embodiment of the present invention.
Figure 2:
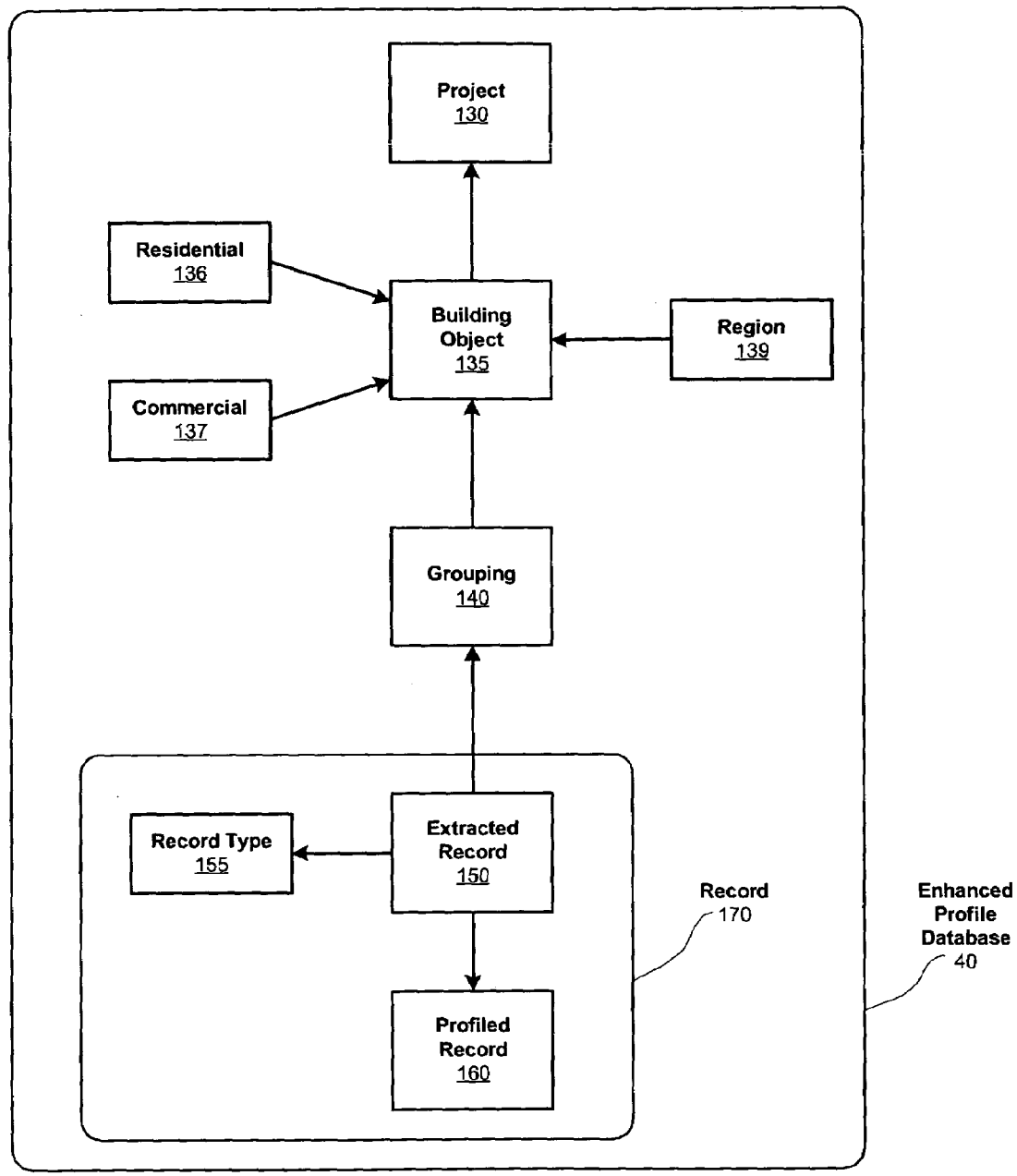
FIG. 2 is a schematic diagram, showing the general structure of an enhanced profile database, according to an embodiment of the present invention.
Figure 3:
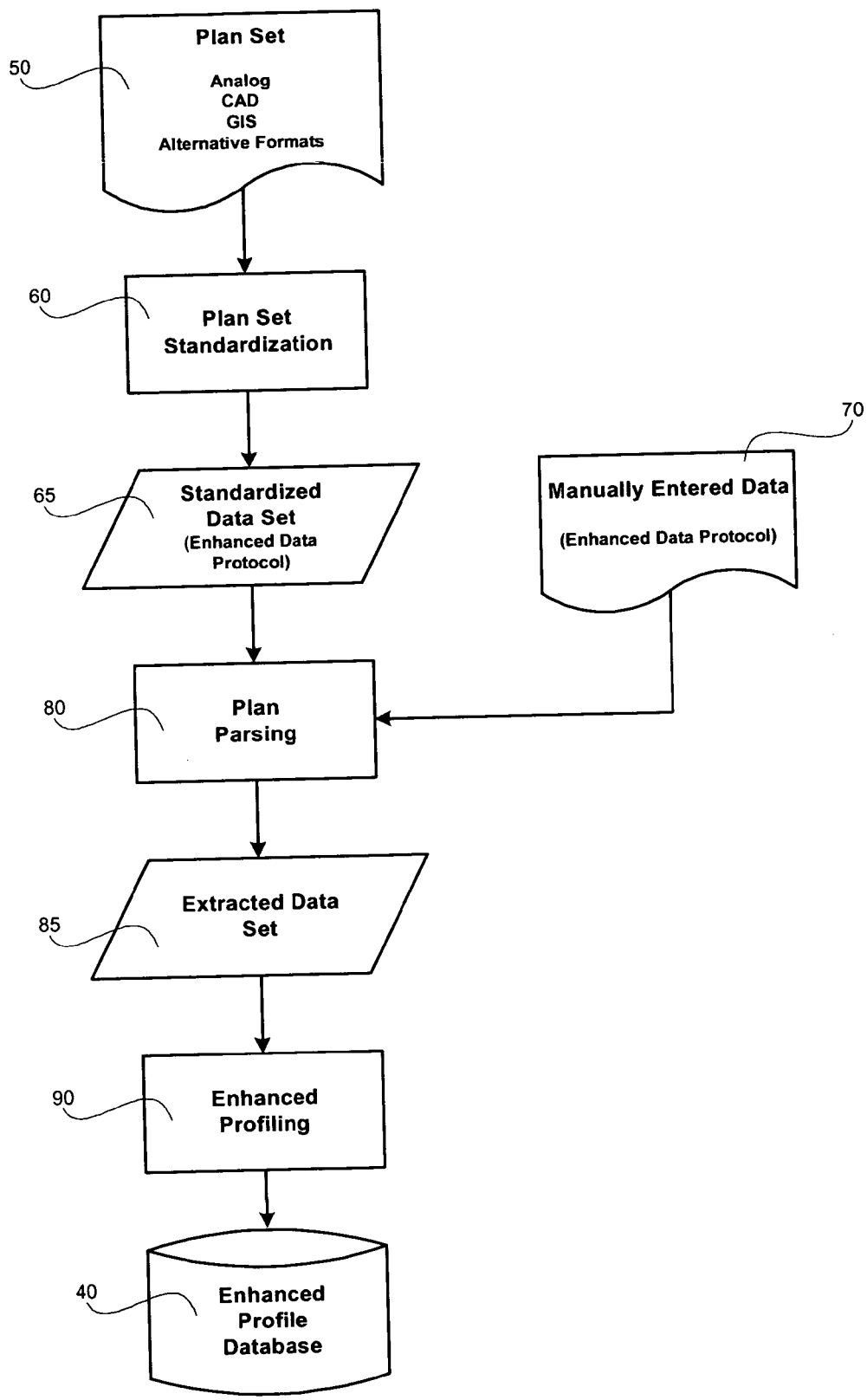
FIG. 3 is a block diagram of further steps taken in practicing an embodiment of the present invention.

FIGS. 1 through 3 schematically shows a preferred implementation of an interactive profile system 10 of the present invention. The interactive profile system includes an application engine 20 and a profiling engine 30 that are programs based within a single or a networked computer, or server. A central feature of the interactive profile system is an enhanced profile database 40, which interacts with the application engine 20. The application engine interfaces with a user 25. Most preferably, the user employs an Internet-based browser. However, the user could also access the application engine of the interactive profiling system through a kiosk environment, a LAN environment, a corporate Extranet, CD-ROM specific applications, or equivalent operating environments. Currently, for Internet access, graphical web browsers such as Internet Explorer, Netscape Navigator, Opera, and Mosaic are widely used and commercially available. Text-based Internet browsers such as Linux could also be employed. WAP (wireless application protocol) could also be utilized to access the interactive protocol system. WAP is a secure specification that allows users to access information instantly via handheld wireless devices such as mobile phones, pagers, two-way radios, "smart phones" and communicators.

The process of the invention employs the interactive profile system 10 to interface with the user 25 and enable the user to modify and query the enhanced profile database 40 that contains the highly detailed attributes of a specific building. The term "building" is used herein to include any structure, such as a home, office or warehouse. The term also includes the property that the structure occupies. Therefore, the building also includes "siting" aspects of the structure, such as the location of the structure on the property, the furnishings and additions in or around the structure, and can even include the routing of utilities to the structure.

The generation of the interactive, enhanced profile database 40 is a key element of the present invention. To begin the formulation of the enhanced profile, a plan set 50 is received into the interactive profile system 10. The plan set includes a plurality of potentially interrelated building components. The plan set is a fundamental description of the building or a portion of the building, which can be any built structure. All structures include a plurality of potentially interrelated components. These interrelated components are individually or functionally grouped structures or features that comprise components of the finished building.

In a plan set standardization 60, which is a function contained within the interactive profiling system 10 of the present invention, the plan set 50 is converted to a standardized data set, as detailed in FIG. 3. The profiling engine 30 of the enhanced profiling system then converts the standardized data set into the enhanced profile database 40, which is built in a format that is compliant with an "enhanced data protocol." The enhanced data protocol establishes a standard framework for the development of interrelationships between analogous components of the building.

Receipt of Plan Set

The plan set 50 is preferably in the format of a CAD (computer aided drafting or design) data 52 file. The term "format" is used herein to describe the syntax and order of data storage, rather than a particular media or storage device employed to contain data. The CAD format employs vectors to describe objects, instead of points on a coordinate system. CAD graphics are preferred because the objects remain sharp and clear regardless of resolution and are easily revised.

An analog plan 53 can also be input into the plan standardization 60. Analog plans are typified by conventional "blue-prints." Scanned images of these analog plans or drawings form "raster" files, essentially made of pixels. These raster files, such as .bmp, tif, gif, jpg, and .pcx formats, to name but a few, are easily converted to a CAD format by using proven accurate raster-to-vector technologies. The analog plans can first be scanned at a resolution sufficient to ensure accurate data translation of the plan set. Vector based, digital files are generated from the scanned images using standards for accuracy compliant within the industry. To best ensure that all "line work" entered as a scanned or raster file is converted to a proper scale, the line work is entered at a selected scale for active dimensioning to be accurate.

For the present invention, the preferred vector file format follows the enhanced data protocol to ensure smooth transition to the profiling engine 30. Linkages between associated components of the plan set 50 are maintained in the standardized data set 65. This linkage preservation aids in future enhancements and manipulations of profile data without a loss of these linkages.

The profiling engine 30 of the present invention simplifies the typical relationship between a client and an architect normally encountered within the complex AEC/CAD (architectural, engineering and construction/computer aided drafting or design) environment. Before the plan set 50 can be developed into the enhanced profile database 40, the data within the plan set must be standardized by the interactive profiling system 10. The interactive profiling system begins with the submission of the plan set. Any appropriate user 25 or agent of the user, such as an architect or designer, can initiate this submittal. Alternatively, the user can submit plan information directly to the profiling engine 30 in a manual entry 70, which is preferably received in the enhanced data protocol.

The submitted plan set 50, which represents the building for profiling with the present invention, may be in any conventional format. Such conventional formats include analog forms or digital files, such as CAD. The plan set can also be in the form of GIS data 51. Alternative formats 54 are also considered as appropriate inputs into the interactive profile system. These alternative formats include outputs from intelligent, direct measuring devices, such as electronic measuring tapes and ultrasonic digital measuring devices. These devices can employ short-range wireless interface technologies, such as Bluetooth™, to directly input data into the profiling engine, as with the manual data entry 70 function, shown in FIG. 1.

Further referring to FIG. 3, the plan set standardization 60 converts the plan set to a standardized data set 65. The standardized data set applies an enhanced data protocol to the data. The enhanced data protocol permits further development of the data by the profiling engine 30.

Most preferably, the enhanced data protocol is CAD compliant, so that the CAD data 52 is efficiently translated into the enhanced data protocol, and later exportable back into the CAD format. As an alternative to the preferable form of a CAD file format, a simple architecturally correct analog plan 53 can be input into the plan set standardization 60. The term "architecturally correct" is used to define a plan set 50 that truly and accurately represents the building to a sufficiently exact scale. The architecturally correct plan may be in the form of a scanned graphical file, or alternatively an analog plan that serially lists the dimensions and features of the building in a text format. With the consent of the author or owner or the plans, who may be an architect, a distributor or a builder, the analogue plan is easily converted to digital format.

The profiling engine 30 of the present invention can translate the complex graphical and engineering information within AEC/CAD files to the user-friendly format of the enhanced profile database. The AEC/CAD format is specifically directed to the highly technical requirements of the architect, engineer, draftsmen and contractor. For the present invention, the user 25 is not required to be an expert in the use of any complex data formats. Instead, the user need only to have a web browser, or appropriate input device, and a nominal ability to interact with the profile database through the application engine 20 of the interactive profile system 10.

Converting the Plan Set to a Standard Protocol

For the present invention, the enhanced data protocol is an internally standardized profile database format that enables the plan set 50 to be expanded and utilized by the interactive profile system 10. The enhanced data protocol is a specifically formatted system that organizes and provides for expanding the standardized data set 65 within a standardized array. The plan set is converted to the standardized data set by the profiling engine 30 of the interactive profile system. The standardized data set has a form that can be expanded into a "super-set" of the plan set in a format that complies with the enhanced data protocol.

By referring to the enhanced data protocol as "internally standardized," the intent is to comment that the enhanced data protocol is somewhat arbitrary in form, but must be consistent within any given application of the present invention. The arbitrary nature of the format of the enhanced profile database 40 is simply explained, in that any database designer skilled in the technology could structure the database in many equivalent ways. The exact syntax employed is a matter of design choice and not subject to undue experimentation. Though the generalized structure of the enhanced profile database and it relational attributes are considered novel, the selected protocol need only be consistent and adhere to the functionally generalized structure, as disclosed herein.

The enhanced profile database 40 need not be embodied within a server, as preferred. The enhanced profile database could exist in a user's server or computer. Because data storage means are universally portable and easily assessable at high bandwidths, the physical location and connection means for the database are not critical to the present invention.

It is possible that a digital file comprising the plan set 50 can be collected without linked attributes, as would be required for "non-Microstation" software applications such as AutoCAD™, Solidbuilder™, VersaCAD™ and GeneriCAD™, to name a few. The data file of the plan set can be translated, either manually or with the aid of a program, to the correct level, color, line style, and line weight to match the enhanced data protocol utilized by the profiling engine 30. This standardized protocol, preferably in a CAD format, or alternatively an SVG (scalable vector graphic) format, facilitates linkage and extraction to the enhanced profile database 40. Other alternative formats include FLASH™, VML (Vector Markup Language), and VRML (Virtual Reality Markup Language). VRML could be especially useful in facilitating "walk-throughs," or virtual views by the user as an optional profile query 177.

The preferred mechanism for the data format conversion or plan set standardization 60 function of the profiling engine 30 of the present invention employs "XML" (Extensible Markup Language). XML is preferable over "HTML" (Hypertext Markup Language) because it is not a fixed format-like HTML. XML is designed to enable the use of "SGML" (Standard Generalized Markup Language). SGML is a system for organizing and tagging elements of a document. SGML manages large documents that are subject to frequent revisions and need to be printed in different alternative formats over the "World Wide Web," or Internet. XML is not a single, predefined markup language, but a "meta-language" that can be utilized to describe other markup languages. Predefined markup languages, like HTML, define a way to describe information in one specific format of documents. XML permits the definition of customized markup languages for different classes of documents.

For the present invention, a graphical representation or drawing of the building is received into the interactive profiling system 10 as a plan set 50. The drawing needs only to be architecturally correct for accurate conversion into the enhanced data protocol. The architecturally correct drawing may be a simple set of text based listings, a raster file, or two-dimensional data. More preferably, the plan set can be a more complex data set. Such complex data formats include vector file formats as typically found in both CAD file and SVG file formats. For the purposes of the present invention, raster files should be converted to CAD files. Most preferably, the format of the drawing is converted into an SVG format for integration into the XML. The conversion of CAD images into SVG is a known and easily performed task. All standard vector formats, such as .DXF, typically utilized in AutoCAD™, are easily converted to SVG format.

A preferred format for the received plan set 50 is a CAD file. Again .DXF is a well-known example of such a format, as are .DWG, .DGN or .DFG. As disclosed above, and detailed in FIG. 3, a standardized data set that is compliant with the enhanced data protocol is generated from the received plan set. Converted into the enhanced data protocol, the standardized data set 65 includes a framework for further enhancement by the profiling engine 30. The standardized data set is essentially the beginnings of a relational library with an attribute table prepared for each component of the enhanced profile database 40. Each component of the standardized data set can now be developed and uniquely identified and tied to every related component.

Parsing the Plan Set

After the plan set 50 is standardized by the plan set standardization 60, the resulting standardized data set 65 conforms to the enhanced data protocol. A plan parsing 80 is then performed on the standardized data set by the profiling engine 30 to convert the standardized plan set into an extracted data set 85. The profiling engine parses the standardized data set to develop the plurality of potentially interrelated components into a plurality of interrelated components. The plurality of interrelated components are highly detailed features of the building. Interrelationships among the components exist as substantially unrealized until the relationships are developed with the profiling engine. The extracted data set formed by the parsing can be enhanced and further manipulated, and is in a format that is accessible by the query capabilities of the application engine 20.

A primary function of the plan parsing 80 is to facilitate a systematic enhancement of the plan set 50. The plan parsing builds upon the elemental physical description as provided in the plan set. Each element of the physical description is parsed into the extracted data set 85 for further functional analysis to develop the architecturally correct plan set into the enhanced profile database 40. In parsing the standardized data set 65, the profiling engine 30 extracts physical dimensions and attributes of the building and develops the building into the plurality of interrelated components.

Developing the Enhanced Profile Database

The potential links and relationships between the components of the building are realized and developed by the profiling engine through an enhanced profiling 90. The linkages developed in the enhanced profiling include an association of all physical attributes as derived from line work and component descriptions in the received plan set 50. Related attributes can be combined for component lists such as door and window schedules. Additional tags and labels originally present in the plan set might also be utilized to determine generic quantities of materials such as nails, studs, concrete volumes, drywall surface areas and roofing.

These generic material quantities are based on the common properties of individual building components. Such generic components, such as specific dimensional lumber and light switches are essentially interchangeable. Specialized sub-components such as cabinetry and appliances would be included as individual entries that stand alone.

The calculated generic quantities can be directly linked to pricing variables for generating rough cost estimates. The pricing variables can be supplied and updated through a database connection to an appropriate supplier. FIG. 1 shows that a variety of external databases 100 that can each interface with the application engine 10 of the present invention.

One of these external databases 100 is preferably a material database 101. The application engine 20 can, as needed, access one or more builder databases 104 to acquire the best unit price for certain universal building components. These builder databases may also provide quotations or at least suggested prices for specific or custom items, such as appliances, light fixtures or custom cabinets. Pricing and ordering of appliances, furniture, fixtures and accessory items may also be provided in a furnishings database 102.

It should be noted that connection to these external databases 100 may occur in an asynchronous fashion, that is, the user on the internet workstation may not necessarily have to realize a "live" (synchronous) connection to the external database. With modern caching technology, mirror image 'snapshots' of the external databases can be collected on a regularly scheduled basis and integrated into the information technology infrastructure where the profiling engine resides. This approach minimizes the potential for service disruptions and maximizes performance and responsiveness to the user.

The enhanced profile database 40 provides users of conventional CAD files with a tool to efficiently view every component part of the building. Additionally, relationships between components and groups of components are easily accessed such as the exact location of these components within the building and lot boundaries, the location of the building within the lot on down to finish details such as electrical outlet covers or cabinet door hinges. The interactive profile system becomes a powerful tool to cross reference all required regulatory codes and engineering data, enabling smoother and faster plan checking at the development or regulatory inspection stages.

The profiling engine 30 function of enhanced profiling 90 assigns a uniquely identifying descriptor tag to every component part of a building. Every element of the extracted data set 85 that represents a component feature within the building is given a unique identifier. Required details such as location, quantity, length, height, area, and volume can be extracted. The resulting extracted data set is read by the unique profiling engine 30 of the present invention, to expand on details and link elements within the plan set 50.

The enhanced profiling 90 function of the profiling engine 30 links the components of the building to develop a large number of logical interrelationships within the enhanced profile database 40. Structural assemblies, such as foundations, floors, roof systems and walls can each receive limited input from the user to add to the enhanced profile database, after the profile database is compiled and prepared to receive additional attributes. This additional input can be derived from several sources, such as dialog with or feedback from the project's architect or construction contractor.

Additionally, the extracted data set 85 can be enhanced with links to engineering requirements that are specific for a region, based upon project location. These regional properties typically relate to climatic needs, along with local zoning and code requirements. Additionally, engineering related input, such as concrete reinforcement, post sizing, wood treatment requirements, and earthquake protections, can also be linked to the extracted data set. The enhanced provide database 40 can then access the linked data when the user 25 modifies the component in a query or data modification function. The information made available as a result can be included in design decisions. More obscure information, such as unique site-specific inputs could also be included. This site-specific input can include a suggested fastening for foundation components, to "floating" foundation pads that might be required for the placement of the building structure on clay or sand.

Preferably, the enhanced data protocol is configured to enable an interface with a reference database 107, which is one of the many possible external databases 100. The reference database preferably contains a collection of pertinent regulatory codes, engineering data, and material costs. A regulatory database 108 can be utilized specifically for the purpose of checking any selected structural component against pertinent regulatory codes.

For future development, the enhanced profiling 90 might have the ability to generate "3D" (three-dimensional) CAD based volumes of components. Currently, the interactive profile system can include options for wood frame, stick built, steel stud, and wall component construction. Additionally, calculations of stud spacing, cripples, headers, trusses, joists and the like, can be calculated from the typically two-dimensional data extracted from the plan set 50. Building features which are influenced by regional building techniques, such as style and engineering of a roof system, and selection of exterior sheathing and weather proofing, can be linked to the extracted data set 85.

Building the Profile Database

The profiling engine 10 can now load the enhanced profile database 40 with the components of the building, including the appropriate tag information and expanded data from the plan parsing 80 and enhanced profiling 90 functions. The enhanced profile database is organized into related groupings that include each room's physical measurements and volume, door and window schedule and dimensions, tag and label sections. With this relational database, the profiling engine can determine the number of any component group in the building, and similarly select any one of these components from a resulting query to modify the attributes of the component and review the modification's impact on related components, as in a remodel or addition to the home or building.

The enhanced profile database 40 includes information such as integral measurements of each component, the measurements of all sub-components, and quantities of all building and finishing materials. These "sub-components" are the parts and pieces of any particular component, and can include fasteners, nails, studs, and coverings, for example.

For building and maintaining the enhanced profile database 40, the enhanced profiling 90 function of the profiling engine 30 employs standard "off-the-shelf" tools. Additionally, the enhanced profiling function is "smart" in that the database building tools recognize the linkages between component parts of the building and loads the database accordingly.

Additionally, the application engine 20 can, as preferred, interface to the enhanced profile database 40 with off-the-shelf tools. Such access tools are also able to intelligently recognize the component parts of the building objects and access the database as required to fulfill the needs of the user 25. These needs specifically pertain to queries and inputs relating to the further development of projects within the database.

Timberline™ and Conac are software tools that can be employed to provide estimates for construction projects. However, these estimating programs fail to fully profile the structure as performed with the present invention. Many of them, as Timberline cite the ability export data into a CAD format. Few of these applications, such as Conac, additionally cite the ability to generate estimates from CAD drawings. However, none further develop this CAD drawing, employing the method of the present invention. The interactive profile of the present invention begins with a plan set 50 and develops it into an enhanced profile that fully and accurately discribes a structure, not just for a singular estimating purpose in direct relation to the components shown on the CAD drawing, but for any profile query 177 as based on the enhanced profile database 40. With the architecture of the enhanced profile database formed to associate the components of the structure, the need for highly developed, structured assemblies generated by complex, third party database applications is eliminated. Most preferably, custom extraction procedures and programs are utilized to read all elements within the plan set 50 files and extract the measurements, door and window schedule and dimensions, tag and label information required for standardization 60, parsing 80, and enhancing 90 with the profiling engine.

The application engine 20 can cross reference the enhanced profile database 40 with any or all of the external databases 100, particularly the reference database 107 or the regulatory database 108, to check code requirements and to perform cost calculations. These checks and calculations can be completed for the user within the time frame acceptable to their Internet "surfing" demands. These external databases are most preferably configured and maintained by third parties, such as regulators and some trade organizations for appropriate codes and regulations, and building supply wholesalers, for up to date construction material pricing. Any one of these external database providers could affiliate with the interactive profile system 10 to provide an affiliate database 109 that would be included in the external databases for a fee. However, the operator of the interactive profile system could timely provide these external databases or particular reference databases, as needed.

Once the burden of regulatory codes, engineering data, and construction cost calculations are lifted from the user 25, the user is free to modify the design of the building with respect to material choices, finishes, and related construction decisions. The user can modify components of the building in a data set revision 120, as shown in FIG. 1. The application engine 20 modifies the component of the building and submits the revised component to the plan parsing 80 function of the profiling engine 30. The profiling engine then reprocesses the data set via the enhanced profiling engine 90 and stores it in the enhanced profile database 40.

The present invention's interaction between a "lay" or non-professional user, and the complex construction process is not currently available and is a considerable improvement over any known construction assistant or administration product. The non-expert user is elevated to a technical expert level equivalent to a building designer. By implementing existing and emerging technologies of the Internet and data management, the present invention enables the user to participate in the building design process at a level not possible with present client-to-architect, or client-to-contractor relationships.

Database Relationships

FIG. 2 shows a model architecture of the preferred enhanced profile database 40. As discussed above, the database is a relational database. The enhanced profile database is preferably embodied within a database server. The enhanced profile database is initially "built" or established by the profiling engine 30 and then maintained and further developed through access by the application engine 20.

Project

The highest entity in the enhanced profile database is a project 130. The project contains the overall attributes of the project such as a project identification, which can be an alphanumeric designation, and a short project description. The project is an aggregate grouping of objects related to a specific user or user group. Typically the project can encompass one or more of a building object 135.

Building Object

A building object 135 describes the specific building or structure with its name and location. A GIS (geographic information system) tag can be included to site the building on the property to a high degree of accuracy. GPS (geographical positioning systems) can also be utilized to supplement the enhanced profile database 40 with additional information pertaining to the location of building objects. The building object entity has two sub-entities; commercial 136 and residential 137. These sub-types contain additional information and control parameters. Typical building objects can be a house, an apartment, a condominium or commercial structure.

Region

Since regionalization is an important aspect of the interactive profiling system 10 of the present invention, each building object 135 is most preferably assigned to at least a region 139. This region entity combines such control indicators as a foundation identifier, a framing identifier, an insulation identifier, and a roofing identifier. These identifiers or indicators provide the link to regional building codes and standards that are preferably included in one of the external databases 100, which are shown in FIG. 1, and are relevant for the estimating and construction logic of the application engine 20. The building objects are composed of at least a single grouping 140.

Grouping

The grouping 140 contains information such as a grouping identifier, a grouping name and functional description. The most typical grouping is a room, but the grouping can be any identifiably separate area, such as a deck, carport or porch. Additionally, the grouping includes calculated values such as perimeter, room volume and floor area. This linkage of calculated values within the enhanced profile database 10 provides for easy retrieval of relevant information such as area for carpeting of the floor. Each grouping is assigned to a building object 135 and any number of related groupings can be assigned to one building object.

Extracted Record

Components of the plan set 50 can include individual walls, floors and ceiling. These components are extracted into the enhanced profile database and so each are referred to as an extracted record 150. Each extracted record is tracked with such parameters as location, width, height and depth as well as any additional CAD data originally in the plan set. Examples for extraction records include a specific window or floor type. The extracted records are associated in important relationships with the entities grouping 140, building object 135 and project 130. Each extracted record is allocated to a grouping. This relationship provides an association to track CAD information of the extracted record as it relates to the grouping. As an example, a room grouping is bordered by a set of at least four wall-extracted records.

Record Type

Each extracted record 150 is assigned a record type 155, which summarizes general control parameters and tracks the general control parameter of the extracted record. Examples for a record type can be; kitchen appliances, bathroom fixtures, electrical outlets, wall coverings, windows and doors styles. These record types as found in the plan set 50 data are represented in the enhanced profile database 40. Additionally, the record type is employed to track and link extracted records.

Profiled Record

A profiled record 160 is assigned to an extracted record 150. All components assigned to a specific structure element describe the construction details of such a structure element, as developed by the enhanced profiling 90 of the profiling engine 30. As an example, the components of a wall-profiled record include all of the 2×4's, insulation, sheet rock, electrical and plumbing conduits and pipes, and other materials, down to nails and screws, all supplementing a typical wall-extracted record. In addition to material information, location and construction information is developed by the enhanced profiling function and also stored as the profiled record.

Together, the extracted records 150 and the profiled record 160 can be referred to as records 170. These records are the chief components of the enhanced profile database 40. The database also includes associative and relational information, such as the record types 155 that supplement the records and are used to link the individual records.

Querying the Profile

The user 25 can direct a profile query 177 to the application engine 20 of the interactive 16: profile system 10, as shown in FIG. 1. The term "query" is broadly interpreted to include requests to modify records of the enhanced profile database. The profile query is preferably submitted over the Internet with the user's web browser. The profile query is relatable to the enhanced profile and more specifically relatable to at least one of the plurality of interrelated elements of the building. The profile request can query the enhanced profile database 40 on several levels of complexity and relational associations, either requesting a listing or modifying components of the database. Therefore, the term "query" can also apply to an inquiry into the enhanced profile database, relating to a specific component or to the interrelationship between one or more building components.

The application engine 20 responds to the profile query 177 with a profile response 178. The profile response includes a listing of at least one of the plurality of interrelated elements of the enhanced profile database 40. These interrelated elements can be associated, related or grouped, in any report format that the user 25 requires. The profile response to the profile query is sent to the user, preferably over the Internet to the web browser of the user.

Each user 25 of the interactive profile system 10 is uniquely identified when the interactive profile system receives a plan set 50. Access to any particular plan set or the resultant enhanced profile database 40 is restricted to authorized users. Access to the interactive profile system by a user includes the issuance of user identification and an access code by the application engine 20 for that specific user and project or building.

The user 25 may have chosen one particular plan set 50 for a project 130 and, after having completed substantial selections through the application engine 20, become dissatisfied with one or more of their original plan choices. Upon reflection, the user may choose an alternative plan set and reapply the selections previously made in regards to the original plan set. To help this action by the user, the application engine permits the user to search the enhanced profile database 40 for one or more of the user's profiles from past projects. This profile history is essentially the user's "portfolio." The results of the user's search within the enhanced profile database, as performed by the application engine, can include a project name and additional information, such as a tax parcel number and/or a legal description, to describe the project; similar to a project history or status report. These results are generated and then transmitted to the user. The user can review the results and then respond back to the application engine with a specific profile query 177 regarding any of the projects 130.

For a specific project 130, the application engine 20 can receive a profile query 177 from the user 25, preferably in the form of a questionnaire or a project input as formulated within the application engine and based upon input from the user through the user's web browser. The profile query details the criteria for the search as performed by the application engine. This profile query can include, for example, details of the project, summarized in Table 1 as follows:

Table 1: Example Topics of Query Requests for Enhanced Profile Database

Door Schedules
Interior closets, trim and cabinets
Exterior closets and trims
Windows
Interior/Exterior Finishes
All Openings
Interior Elevations
Trim lengths, Baseboard, Band molding, Crown molding, cabinetry, counter-tops, wall surfaces, Appliance types and "Volumes" and required Utility Connections
Dimensional Data of any particular component, such as length, width, height, or depth "Volumes"
Opening Identifiers (plan specific)
Mechanical Identifiers (by zip code or country)
Plumbing schematics
Heating/ventilation schematics
Suggested Solar Energy options
Electrical Identifiers (by zip code or country)
Electrical schematics
Wall Outlets
Electrical Switches
Lighting Schedules
Fuse Box options After the application engine 20 receives the profile query 177 from the user 25, the application engine then generates a search based upon the profile query. The profile query may be a request for a listing of components or a "what if" request. The application engine preferably transmits the profile results 178 of the profile query in the form of a report.

If, however, the user 25 submits a profile query 177 that modifies a record 170, as would be performed if the user requires or desires a change to a component of the project 130, a data set revision 120 order can be generated by the application engine 20, as shown in FIG. 1.

Options/Preferences

The application engine preferably includes a function that provides all the settings, preferences, account information and controls for using the interactive profiling system 10. The controls include access permissions, account information, filtering controls, permission marketing, and e-Commerce controls to name a few. Such functions are widely known in the field of computer technology.

To maintain privacy in the interactive profiling system, each user 25 of the interactive profile system 10 is uniquely identified when a plan set 50 is submitted. Access to any particular plan set is limited to authorized users. When the profiling engine 30 receives a plan set submission request from a new user, the user is issued user identification and an access code for that specific user. The user, once verified, may select one or more building objects 135 for manipulation with the application engine and subsequent access to the profile database. The results of queries to the profile database by the application engine are generated and then transmitted to the user. The user reviews the results and then can respond back to the application engine. The user's profile query 177, as received by the application engine, is preferably in the form of a questionnaire or a "fill-in" query formulated by the application engine based upon input from the user.

System Architecture

The present invention preferably employs the Internet to facilitate the interaction between the users 25 and the interactive profiling system 10. A significant reduction in the time, complexity and uncertainty involved in the construction process is realized through the novel application engine that this invention provides. The intricacies of plan revisions and material listings, to name a few, are coordinated and simplified into a series of specific functions of the application engine, as included within the interactive profiling system. The application engine 20 meets the needs of the users in providing a powerful tool that is fast, private and secure. For each progressing project, the interactive profiling system can receive revisions and comments from any number of users, in the dynamically evolving project.

The present invention provides improved interaction between the client and the builder throughout the construction process. Input from the client is not only maintained throughout the design and building, but the client drives the process forward, better empowered to make cost effective decisions that meet the client's needs. The builder benefits by having timely decisions without over-management or the nuisance and added expense of change-orders.

As discussed above, the preferred architecture of the interactive profile system 10 interfaces with end users through an Internet path, preferably a Web Server that is preferably a commercially available, "SSL2-compliant" type of web server, such as Stronghold™ or Netscape™, an application engine 25, and preferably includes a database server. The database server can run on a commercially available Relational Database Management System (RDBMS) such as Oracle™, Informix™, or Sybase™. Alternatively, a networked set of database servers can be utilized. The interactive profile system also includes disk storage for the enhanced profile database 40 and miscellaneous data used by the application engine 20, web server, and operating system. This miscellaneous data storage can, as preferred, include a user database. The Web Server, database servers and disk storage communicate over an industry-standard TCP/IP network, and all exist within a firewall to prevent unauthorized access.

The web server is accessed via a site administrator's web browser or the web browser of the user 25. Additionally, browsers running on computers connected to the local TCP/IP network within the firewall have access to the server for administration and development purposes.

The programming for the application engine 20 may be written in any language or combination of languages providing access to the server environment, TCP/IP network, and RDBMS. Examples of such languages are C, C++, Perl, and Visual Basic. Access to the RDBMS is through language and RDBMS-specific APIs, which are familiar to anyone versed in this technology. The application engine includes one or more auxiliary subprograms or operations, such as: user administration, project history, registration, help, web pages or store fronts, accounting, and site administration.

The server runs on a workstation-class or better computer, such as a Sun™ UltraSPARC™ or Dec Alpha™, running a commercially available operating system, such as UNIX or Linux™, Windows NT™ or Macintosh OS™. The database server is also a workstation-class or better computer running the same or a different, commercially available operating system as the server computer. Disk storage is made available either through stand-alone, commercially available disk storage subsystems, or a workstation-class or better computer making available its local disk storage to other computers on the TCP/IP network. The application engine 20 has no specific dependence upon the type of server, database server, or disk storage used, so the hardware may be upgraded as faster, more capable, and more technologically advanced systems become available without modifying the basic functioning of the application engine.

The method of the present invention can also include a number of additional auxiliary functions, such as multiple servers for load-balancing and redundancy, a periodic backup system, redundant disk storage, an Uninterruptible Power Supply (UPS), system and server administration and reporting functions, redundant local and Internet network connections and other appropriate management functions as well known and understood by those skilled in such activities. However, the interactive profiling system 10 does not depend upon any of these auxiliary functions and can elementally perform its basic functions regardless of whether any or all of them are present.

In a preferred implementation of the present invention, the application engine 20 performs software related functions associated with the invention. The "Hypertext Markup Language" (HTML) generated by the application engine specifies a "Common Gateway Interface" (CGI). The CGI allows the transfer of information between a server, which is connected to the Internet or the World Wide Web (WWW) through the graphical interface of a web page. The application engine is designed to accept and return data that conforms to the CGI specification. The application engine can be written in any programming language, for example "C," "Perl," "Java," or "Visual Basic."

CGI parameter information specifying the function to be performed by subsequent invocations of the application engine 20 responds to user, and site administrator actions. The users of the present invention, who can include clients and a site administrator of the interactive profiling system, can collectively be referred to as users. An alternate implementation of a single, central installation of the interactive profiling system 10 consists of a plurality of interactive profiling systems, each performing one or more of the functions associated with the invention.

Based upon inputs from the user 25, the XML generated by the interactive profiling system 10 specifies which of the components of the system, such as the application engine 20, the profiling engine 30, or auxiliary programs are to be invoked. These subsequent application engines may be the same or different application engines than the program that generated the HTML.

Database Utilization

The enhanced profile database 40 is a completely self-defined structure. In other words, once a plan set 50 has been structurally profiled by the present invention, all the information required to estimate, design, build, and renovate the structure is stored in that specific project profile 130. No technicians or industry professionals are required to add to the profile to make it interactive.

In the built-to-order application 175, estimation is performed dynamically. Design changes are flagged and calculated in real-time by the application engine 20 through the data set revision 120 function. Building materials and costs are documented automatically.

The interactive profile system 10 of the present invention employs a "structured attribute mining" (SAM) methodology. The highly detailed, inter-related attributes of the project are "mined" or intelligently queried for the benefit of design, estimating, and building applications. This highly detailed mining can only work with the standardized data set 65 that is then suitably enhanced to form the enhanced profile database 40.

The interactive profile system 10 of the present invention can provide a composite project report detailing everything required to procure, build and renovate the project 130 from inception to completion and beyond. The invention significantly simplifies and therefore expedites the creative decision making progress by automating portions that presently require skilled human intervention. The approach of the present invention requires only a single operator, the client/user. The user can invite others to assist, especially when they require expert guidance, through collaboration tools. This optional assistance is performed within the scope of the expert's qualifications, and is dependent upon the extent of the modifications.

The enhanced profile database 40 depends on the enhanced data protocol for defining and organizing in detail every component part of the complete building object 135. When the interactive profile system 10 is accessed from an affiliate site, a building index can display all the component parts or assets associated with that building. This will make it easy for suppliers and manufactures to sell plan specific products.

If a potential user or customer were to visit a web site that interfaced the interactive profiling system 10 of the present invention, which was selling interior goods, the customer would be able to shop through the interactive profile system. The purchase of specific items, such as curtains, wallpaper, paint, doors, windows, molding, switches, lighting, fixtures and furniture, would be interactively co-coordinated within the enhanced profile database 40 by the application engine 20. Every room or grouping 140 in the house or building object 135, including open spaces, halls, closets, etc. will be included in the building index, similar to the following table:

Table 2: Enhanced Profile Example

Project—Living Room Remodel
    Building Object—Living Room (Room #6) (specs)
    Grouping—Living Room (Room #6) (specs)
        Extracted Record—Room #6 Opening to Kitchen (specs)
            Profiled Record—Room #6 Kitchen Door (specs)
            Profiled Record—Room #6 Kitchen Door Trim (specs)
            Profiled Record—Room #6 Kitchen Door Hardware (specs)
        Extracted Record—Room #6 Opening to Dining Room (specs)
            Profiled Record—Room #6 Dining Room Door (specs)
            Profiled Record—Room #6 Dining Room Door Trim (specs)
            Profiled Record—Room #6 Dining Room Door Hardware (specs)
        Extracted Record—Room #6 Opening to Hall (specs)
            Profiled Record—Room #6 Opening to Hall Molding (specs)
        Extracted Record—Room #6 Wall #1 Window 1 (specs)
            Profiled Record—Room #6 Wall #1 Window 1 Trim (specs)
            Profiled Record—Room #6 Wall #1 Window 1 Casing (specs)
            Profiled Record—Room #6 Wall #1 Window 1 Covering (specs)
            Profiled Record—Room #6 Wall #1 Window 1 Screen (specs)
        Extracted Record—Room #6 Wall #1 Window 2 (specs)
            Profiled Record—Room #6 Wall #1 Window 2 Trim (specs)
            Profiled Record—Room #6 Wall #1 Window 2 Casing (specs)
            Profiled Record—Room #6 Wall #1 Window 2 Covering (specs)
            Profiled Record—Room #6 Wall #1 Window 2 Screen (specs)
        Extracted Record—Room #6 Wall #1 Light Switch 1 (specs)
            Profiled Record—Room #6 Wall #1 Light Switch Cover Plate (specs)
        Extracted Record—Room #6 Wall #1 Outlet 1 (specs)
            Profiled Record—Room #6 Wall #1 Outlet 1 Outlet cover plate (specs)
        Extracted Record—Room #6 Wall #1 Outlet 2 (specs)
            Profiled Record—Room #6 Wall #1 Outlet 2 Outlet cover plate (specs)
        Extracted Record—Room #6 Wall #1 Outlet 3 (specs)
            Profiled Record—Room #6 Wall #1 Outlet 3 Outlet cover plate (specs)
        Extracted Record—Room #6 Wall #1 (specs)
            Profiled Record—Room #6 Wall #1 Baseboard (specs)
            Profiled Record—Room #6 Wall #1 Crown Molding (specs)
        Extracted Record—Room #6 Wall #2 (specs)
            Profiled Record—Room #6 Wall #2 Baseboard (specs)
            Profiled Record—Room #6 Wall #2 Crown Molding (specs)
        Extracted Record—Room #6 Wall #3 (specs)
            Profiled Record—Room #6 Wall #3 Baseboard (specs)
            Profiled Record—Room #6 Wall #3 Crown Molding (specs)
        Extracted Record—Room #6 Wall #3 Built-in Cabinets (specs)
            Profiled Record—Room #6 Wall #3 Built-in Cabinets B Shelves (specs)
            Profiled Record—Room #6 Wall #3 Built-in Cabinets B Brackets (specs)
            Profiled Record—Room #6 Wall #3 Built-in Cabinets B Doors (specs)
            Profiled Record—Room #6 Wall #3 Built-in Cabinets B Hinges (specs)
            Profiled Record—Room #6 Wall #3 Built-in Cabinets B Handles (specs)
        Extracted Record—Room #6 Wall #2 Light Switch 2 (specs)
        Extracted Record—Room #6 Wall #7 (specs)
            Profiled Record—Room #6 Wall #7 Baseboard (specs)
            Profiled Record—Room #6 Wall #7 Crown Molding (specs)
            Profiled Record—Room #6 Floor (specs)
            Profiled Record—Room #6 Ceiling (specs)
        Extracted Record—Room #6 Fireplace
            Profiled Record—Room #6 Fireplace Opening (specs)

Profiled Record—Room #6 Fireplace Venting (specs)
Profiled Record—Room #6 Fireplace Gas Piping (specs)
Profiled Record—Room #6 Fireplace Floor Space (specs)
Profiled Record—Room #6 Ceiling Light (specs)
Profiled Record—Room #6 Cable TV Line The profiling engine 30 has the novel ability to uniquely identify and link each component part of a residential or commercial building within a database specifically for structured query employing the Internet. Identifying all the significant parts of a home and their respective attributes is a new concept. However, the interactive profile system 10 of the present invention goes a step further by identifying every component part with a unique identifier, with each component part identified and assigned specific attributes. This is instrumental during the construction phase of the home and any subsequent renovations or remodels.

A significant benefit in using the interactive profiling system 10 is realized with pre-manufactured homes and remodeling projects. Examples of the benefits include that the base boards for a particular room can be precut for easy installation, trim for a particular doorway can be uniquely identified, and tile, carpeting, and wood flooring can be precut at the factory for exact placement. Advanced security systems can be integrated more quickly and thoroughly if all openings and exit ways are mapped with visual alerts. The interactive profile system 10 can flag items that have not been addressed, or perhaps have been missed altogether. Table 3 lists a variety of potential components in the enhanced profile database for a building object 135 that is a residence.

Table 3: Potential Components Included in Profile
  Doors
    Interior and Exterior, Closets and Cabinets
  Windows
  Interior/Exterior Trims and Finishes
  Reading line work specific to detail drawings
  Trim lengths, baseboard, band molding, crown molding, cabinetry, counter-tops, wall surfaces, appliances and requirement such as clearances, utility connections and "volumes"
  Detailed Dimensional Data (length, width, height, volume, depth)
  Opening Identifiers (plan specific)
  Mechanical Identifiers (by zip code or country)
  Plumbing schematic
  Heating/ventilation schematics
  Solar Energy Options
  Electrical Identifier (by zip code country)
  Electrical schematic (cell based)
  Electrical Outlets
  Light Switches
  Lighting
  Fuse Box An additional benefit of the present invention is the potential to perform quality assurance at all stages of planning the project 130. The original CAD file plan set 50 can be queried to ensure all architectural details are complete. Structural details can be cross-referenced to ensure engineering specifications are met. All component assemblies can be queried to ensure they are complete, fit and are suitable. Recommendations for interior design may be presented based on the components already present.

Exporting Data

As an alternative embodiment of the present invention, the interactive profiling system 10 can export the profiled plan set 50, preferably in CAD format, so that the user 25 can call up the plan from within a profile manager if they ever need to review it for future projects. After subscribing to the interactive profiling system, the user can access any user-submitted plan set 50, which are all available in CAD format, or any other appropriate format, for export. The exported CAD file can also be helpful to the builder during the project management phase.

Currently, "CAFM" (computer-aided facilitates management) technologies are available that include many tools for the management of commercial properties and related functions. These known applications, such as those provided by "Booz-Allen & Hamilton" and "Archibus," include a variety of services that include a relational database as a centerpiece of the system. However, these systems all fail to provide the detailed structural profile of the present invention. The enhancements of these CAFM systems relate to maintenance features rather than the detailed inventory and interrelation of substantially all of the structural components of the building as provided by the present invention.

Visualization techniques utilizing 3D renderings of the structurally profiled building could be better realized with data exported from the enhanced profile database 40. These renderings could be generated directly, in real-time, to give the user the ability to visualize and analyze the existing building or immediately see the impacts of revisions or remodels. This real-time visualization is commonly referred to as "parametric." One such parametric application that the present invention could interface, supplying input data as an export function of the application engine 20, is Revit™.

Architectural Applications

The interactive profile system 10 offers detailed measurements and structural data concerning the component parts of a building for use in a wide range of applications both off and online. As previously discussed, analog plans can be converted into CAD format. Because the CAD plans are standardized under the enhanced data protocol, all profiled plan sets 50 are stored in the secured enhanced profile database 40. These plan sets are accessible through a computer network by way of interface to the application engine 20. A unique plan ID is assigned to each profiled plan to denote its authorship, such as architect, firm, or non-profit organization, to maintain security.

With the interactive profile system 10 of the present invention, AEC professionals can offer their clients the chance to interact immediately with their project plans versus just providing static floor plans and blueprints over extended periods of time. Through custom applications designed specifically to make use of the profiling engine 30, users 25 can apply personal preferences to a plan, including exterior and interior finishes. The users can view the plan through a web browser or equivalent interface. The user has the unique opportunity to apply simple design changes to the plan without sophisticated CAD software. The user can extract exact measurements for every component part of the plan, such as counter tops, hallways, appliance openings, cabinetry, windows and other openings.

With the management application 125, the user 25 can assign asset properties to every component part of the plan. Builders and contractors will have the added advantage of performing complete material takeoffs for calculating the exact amount of materials required for a project, thereby reducing "waste" onsite and saving money. They can potentially interface with a prepackaged, "B2B" (business to business) design and build management software program, such as Cephren™, Bricsnet™ and Bidcom™.

The present invention can also provide a valuable quality control (QC) mechanism for the designer/architect, enabling them to interactively query not only the project specifications but also to monitor the construction process.

Design/Build Applications

Especially for residential structures, the build-to-order 175 application or alternatively defined as a remodel-to-order application, can use the interactive profile system 10 of the present invention to gain a tremendous advantage over more traditional design-build methods. These traditional methods are often plagued with inefficiencies and delays. With the present invention, builders and contractors can give their clients direct control when specifying exterior finishes, interior finishes and various options. The end result can be a preliminary estimate of an entire project. The user 25 would start by having their building plan structurally profiled using the interactive profile system. Depending on the builder or contractor's supplier network, a preferred list of materials and products could easily be assigned to every component part of the structure. In some cases, builders and contractors may choose not to limit the client's selections to a predefined list of materials and products. The client or user would then be free to visit any supplier or manufacturer participating in furnishing the particular external to interactive profiling system. For the typical user, no additional measurements or structural details would be required, when working through the build-to-order selection process. Selections for every significant part of the building can be made through an intuitive point and click interface.

Whether building a new home or remodeling an existing home or building, structural profiling can define the selection process through the series of interactive steps of the invention. Buildings that could employ the present invention can include site-built homes, pre-manufactured homes, homes for sale, rental homes, planned communities, commercial structures, business parks, warehouses, schools, and non-profit facilities.

Enhanced Applications

The interactive profiling system 10 of the present invention can provide the necessary data to generate visual representations of the described structure. This will allow users to execute design decisions and then explore the results of their choices in a visual/spatial context utilizing a form of 3-dimensional (3D) and/or Virtual Reality Markup Language (VRML).

Alternative Applications

The interactive profiling system 10 of the present invention has many potential applications. These applications can be software components of the build-to-order application 175 or the management application 125 already disclosed herein. One of the external databases 100 can be a selection analysis database 106. The selection analysis database could be utilized to compare the user's 25 component selections versus the preferences and limitations previously selected by the user at inception of the project. However, beyond this selection analysis, it is preferred that these alternative applications essentially stand-alone as discrete modules or add-ons. The following examples illustrate some of the additional potential uses of the interactive profiling system:

Residential or Commercial Manager

The management application 125 can include an active calendar system. This calendar can then linked to the interactive profiling system 10. The calendar system acts as a paging or alert prompter. Whenever there is an important action or request to be monitored, the calendar visually prompts the user 25. It can also, or as an alternative, email the user. Other devices can also be alerted, such as cell phones, pagers and PDAs (personal data assistants).

Any assets that relate to the components of the enhanced profile database 40 can be tracked, with auxiliary data entered into an asset profile database 128. The user 25 can track these assets in regard to their procurement or sale, for any number of accounts.

The user 25 can also maintain histories or correspondence relating to interactions with professional service providers, such as architects, builders and contractors. The day-to-day maintenance providers, such as landscapers, gardeners and pool cleaners can also be tracked and scheduled with a direct link to enhanced profile database 40 and the building asset that is being maintained.

The tracking and coordination of designers or decorators can also be accomplished with the present invention. The enhanced profile database 40, which includes details relating to exterior and interior finishing, is a well-suited interface for reviewing existing attributes and for proposing remodels or changes by the user.

Details of systemic components of the project 130, such as plumbing, mechanical, electrical and communication systems, especially as needed by appropriate system providers or builders, can also be tracked and managed through the management application 125. The various service plans and extended warranties for these service providers, their work and the operation of related appliances, can also be accessed within the asset profile database 128. Similarly, leases and rentals for any portion of the building profiled within the enhanced profile database can be coordinated through the management application.

Especially with access to GIS data 51, local government reference databases 107 and regulatory databases 108, the application engine 20 can acquire property tax information, association dues, assessments and liens. This information can all be tracked by the management application 125. Similarly, utility costs and account activities can be viewed, tracked with historical data cross-referencing the accounts with any associated activities or attributes of the building, such as the readings of utility meters.

The asset profile database 128 can act as a library of certain building profile information, especially archival structural information and CAD files. Architectural and structural plans and specifications, engineering details, electrical plans, mechanical plans, mechanical plan review requirements, automatic fire detection systems and home security plans can all be included in the asset profile database for reference and tracking.

This auxiliary building profile information is very useful in coordinating bids for work relating to the profiled building. A bid manager function could be included in the management application 125 to provide all the bidding functions necessary to manage the bidding activities. The bid manager can be connected to numerous service providers. All typical bidding exchanges can be performed through these connections.

E-commerce (Retail)

An e-commerce application could interface with the application engine for matching an appropriate retailer and product with an item requested by the user 25. These applications could also take the form of an external database 100, such as one of the affiliate databases 109 or the furnishing database 102. The maintenance cycles of assets also contribute to e-commerce being pushed to the application. All the necessary information required for matching any specific item could be included in a supplemental database, similar to or within the asset profile database 128. Information including model, manufacturer, size, features and color could be included therein. Merchants and service providers could also provide unsolicited quotation information via a type of enhanced 'yellow pages' service that would pre-price goods and services for the user's or owner's convenience.

Professional Services

A service application could be added to the interactive profile system 10 to match the appropriate service professional with a service requested by the user 25. All the necessary information required for requesting a bid, such as date, time, structural and asset specific data.

Polling

Customized polling capabilities could be included in the present invention. Such polling could be based on the enhanced profile database 40 to make polling more meaningful and so more valuable to the poll collector. The system could also be utilized to enable election polling for any level of government. All levels of government are either contemplating or implementing this capability in the electoral process to further serve the needs of the public who may be unable or incapable (as in the case of elderly or handicapped people) of attending a central polling place.

AEC Planning/Estimating Software

The AEC industry is saturated with software applications that assist industry professionals in the planning and estimating of building projects. Structural profiling can provide the entire industry with a new paradigm. Builders would be able to load structural profiles into their desktop estimating application without having to recreate the assemblies. Builders, contractors and estimators would be able to continue where the customer finishes.

House Remote (Smart Appliance Interface)

In another alternative application of the present invention could provide a convenient way for an "extranet" type of application to interface with a third party technology and services provider, such as a security system provider, a smart appliance provider, web cams, and sales monitoring. The present invention could provide a foundation for implementing the 'smart building' concept that incorporates these types of technologies into a single, cohesive repository of data and a computerized "facilities manager" of the building.

Additional Applications

Numerous additional applications that could interface with the interactive profile system 10 of the present invention include: schedulers, maintenance and replacement logs, insurance activities, such as claims, quotations and premium tracking, a "virtual safe" for storing electronic copies of important documents and information, a finance center, refinancing services, appraisal services, mortgage services, loan services, a data import/export utility, a data format converter, tax and budgeting (i.e. interfaces with the user's financial software that could include Quicken™, and Excel™). Commercial financing, for the project 130 or any sub-component of the project could be introduced into the enhanced profile database in response to a profile query 177. A finance database 105 could be included in the external database 100 to provide such information.

Community information could also be accessed and compiled for the user, such as guides, events, issues, laws/ordinances/zoning, planning, charity, home delivery, and directories. "Knowledge centers" could also be built that can include, articles, tips, books, guides, encyclopedias, and dictionaries. Thousands of content specific articles based upon the enhanced profile database 40 could be acquired by an application employing an Internet search engine and or database aggregation technologies, such as "SmartCode."

Inspection, appraisal, and insurance valuation services could also benefit from the present invention. Since, as previously discussed, the building also includes "siting" aspects of the structure, such as the location of the structure on the property, the interactive profile system 10 could also interact with a real estate database 103 for the purpose of listing the building having the enhanced profile.

A user could provide access to their specific enhanced profile database 40 to allow an inspector to verify code compliance or to quickly have their building reviewed for an appraisal of fair market value. Comparable market values might be provided through access to the real estate database 103. Beside code inspectors, other government entities could also benefit from the present invention. Fire, police and rescue services, with access to the enhanced profile database could quickly review vital information, such as the location of utility shut-off valves, the floor plans or connect with home security system, all through the application engine 20. With the incorporation of wireless protocols, emergency services could instantly access any detail of a profiled structure by referencing the building "explicitly" (entering an address) or by "proximity" (standing next to the building).

Portable devices, preferably employing wireless technologies, could be utilized to serve as a portion of the enhanced profile database 40. Again, these devices can employ short-range wireless interface technologies, such as Bluetooth™, to directly download a structural profile by simply pointing a Bluetooth enabled device at the building.

Additional uses of the present invention could also include interfaces with other, yet-to-be-formulated databases, designated in FIG. 1 as database "n" 110. These databases n could include database aggregation systems, such as "SmartCode™" Output from the application engine 20, in the form of a profile response 178, could be incorporated into a hybrid database as composed by the database aggregation system.

CONCLUSION

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

What is claimed is:

1. A system for generating a post-CAD interactive profile of a building for use in building and remodeling projects, the system comprising:
  a CAD-independent profiling engine executable on a remotely accessible server linked to a computer network, the profiling engine being configured (a) to receive a plan set representing a physical description of the building at a point in time, (b) to create a post-CAD electronic profile of the building based on the elemental plan data, and (c) to store the post-CAD electronic profile in a profile database associated with the CAD-independent profiling engine;
  a user-accessible management application executable on a user computing device linked to the computer network, the management application being configured (a) to store asset data for the building in an asset profile database, the asset data including at least some data relating to component parts added to the building post-construction, which were not included in the pre-profiled plan set, (b) to enable a user to assign user-assigned asset properties to the component parts represented in the asset profile database, to thereby modify the asset data over time, and (c) to communicate the asset data, including the user-assigned properties over the computer network;
  an application engine executable on a remotely accessible server linked to a computer network, the application engine being configured (a) to receive the asset data from the management application, and to store the asset data with the user-assigned properties in the post-CAD building profile stored in the enhanced profile database, and (b) to make the post-CAD profile accessible to remote query via a computer network; and
  a build-to-order application executed on a third-party computer linked to the CAD-independent application engine via a computer network, the build-to-order application being configured, in response to an authorized query for a preliminary estimate of a building project, (a) to access the post-CAD profile of the building via the CAD-independent application engine over a computer network, and (b) to generate a preliminary estimate for the project based on the post-CAD profile of the building, wherein the preliminary estimate includes a preferred list of products for the component parts of the building.

2. The system of claim 1, wherein the preliminary estimate includes a cost estimate.

3. The system of claim 1, further comprising a regulatory database, wherein the application engine is configured (a) to identify the building code applicable to the building profiled, and (b) to determine the compatibility of each product in the preferred list with the applicable building code.

4. The system of claim 1, further comprising a furnishings database, wherein the application engine is configured to select furnishings from the furnishings database that are compatible with the building based on the post-CAD profile, and to include information on the selected furnishings in the preliminary estimate.

5. The system of claim 1, further comprising a builder/contractor database, wherein the application engine is configured to obtain a price quotation from at from the builder/contractor database, and include the price quotation in the preliminary estimate.

6. The system of claim 1, further comprising a materials database containing information on type, price, and supply of materials, wherein the application engine is configured to (a) select appropriate type of materials for the building project based on the post-CAD electronic profile of the building, (b) obtain price and supply information for materials, and (c) include type, price, and supply information for materials in the preliminary estimate.

7. A method for providing a post-CAD electronic profile of a building for use in construction and remodeling projects, the method comprising:
  creating a post-CAD electronic profile of a building, including a three-dimensional representation of the building and its component parts, the post-CAD electronic profile being created based on a plan set of the building, processed by a CAD-independent profile generating engine;
  storing the post-CAD electronic profile in a database associated with a remotely accessible server, the server being linked to a computer network and configured to execute an application engine configured to communicate with the database and modify the stored post-CAD profile;
  receiving asset data input at a management application accessed by an authorized user via a user computer device, at least a portion of which asset data represents one or more post-construction component parts added to the building after initial construction of the features shown in the pre-profiled plan set;
  communicating the asset data input from the management application to an application engine on the remotely accessible server;
  updating the post-CAD electronic profile of the building to include the asset data input from the authorized user;
  receiving a request from an authorized user for a preliminary estimate for a project, based on the CAD-independent profile of the building, the request being received at a build-to-order application executed on a third-party server linked to a computer network; and
  in response to the request from the authorized user, generating a preliminary estimate for the project, based on the updated post-CAD electronic profile including the post-construction component parts.

8. The method of claim 7, wherein the preliminary estimate includes a cost estimate based on parameters in the post-CAD electronic profile.

9. The method of claim 7, wherein the preliminary estimate includes a list of recommended products based on parameters in the post-CAD electronic profile.

* * * * *